United States Patent
Gagne et al.

(10) Patent No.: US 11,402,850 B2
(45) Date of Patent: Aug. 2, 2022

(54) ROBOTIC CLEANING DEVICE WITH OPERATING SPEED VARIATION BASED ON ENVIRONMENT

(71) Applicant: Diversey, Inc., Fort Mill, SC (US)

(72) Inventors: Aurle Gagne, Mechanicsville, VA (US);
Philip Scarim, Troutville, VA (US);
David M. Knuth, Jr., North Chesterfield, VA (US); Philip J. Hennessy, Midlothian, VA (US);
Anthony T. Bavuso, Seaford, VA (US);
Stephen J. Balas, Midlothian, VA (US)

(73) Assignee: Diversey, Inc., Fort Mill, SC (US)

(*) Notice: Subject to any disclaimer, the term of this patent is extended or adjusted under 35 U.S.C. 154(b) by 390 days.

(21) Appl. No.: 16/467,223

(22) PCT Filed: Dec. 8, 2017

(86) PCT No.: PCT/US2017/065296
§ 371 (c)(1),
(2) Date: Jun. 6, 2019

(87) PCT Pub. No.: WO2018/107024
PCT Pub. Date: Jun. 14, 2018

(65) Prior Publication Data
US 2020/0064857 A1 Feb. 27, 2020

Related U.S. Application Data (60) Provisional application No. 62/595,317, filed on Dec. 6, 2017, provisional application No. 62/432,116, filed on Dec. 9, 2016.

(51) Int. Cl.
*G05D 1/02* (2020.01)
*A47L 9/00* (2006.01)
(Continued)

(52) U.S. Cl.
CPC ............ *G05D 1/0274* (2013.01); *A47L 9/009* (2013.01); *A47L 11/4011* (2013.01);
(Continued)

(58) Field of Classification Search
CPC ..... A47L 9/28; A47L 1/00; A47L 1/02; A47L 5/00; A47L 11/00; A47L 11/02;
(Continued)

(56) References Cited

U.S. PATENT DOCUMENTS 6,667,592 B2  12/2003  Jacobs et al.
8,423,225 B2  4/2013  Hillman, Jr. et al.
(Continued)

FOREIGN PATENT DOCUMENTS

GB  2398394 A  8/2004
WO  2016048238 A1  3/2016

*Primary Examiner* — Bhavesh V Amin
(74) *Attorney, Agent, or Firm* — Daniel Moderick, Jr.

(57) ABSTRACT

A system and method of causing a robotic device to navigate an area, including accessing a map of an area of travel, causing a transport assembly of the robotic device to move the robotic device in the area at a first speed, collecting information about the area as the robotic device moves in the area by at least one sensor, and processing the information collected. The system and method also include comparing the information collected with the information regarding the area from the map, and determining a degree of confidence that the information collected matches the information regarding the area of travel from the map. When the determined degree of confidence is at or below a first threshold degree of confidence, a first reduced speed mode of operation causes the transport assembly of the robotic device to move at a second, lower speed.

22 Claims, 9 Drawing Sheets

(51) Int. Cl.
*A47L 11/40* (2006.01)
*G05D 1/00* (2006.01)

(52) U.S. Cl.
CPC ....... *A47L 11/4036* (2013.01); *A47L 11/4061* (2013.01); *G05D 1/0088* (2013.01); *G05D 1/0223* (2013.01); *A47L 2201/04* (2013.01); *G05D 2201/0203* (2013.01)

(58) Field of Classification Search
CPC .......... A47L 11/22; A47L 11/24; A47L 11/26; A47L 11/28; A47L 11/29; A47L 11/32; A47L 11/36; A47L 11/34; A47L 11/38; A47L 11/40; A47L 13/00; A47L 11/03; A47L 11/10; A47L 11/20; A47L 11/04; A47L 11/282; A47L 11/284; A47L 11/292; A47L 11/294; A47L 11/30; A47L 11/33; A47L 9/009; A47L 11/4011; A47L 11/4036; A47L 11/4061; A47L 2201/04; B25J 11/00; B25J 9/16; B25J 19/02; B25J 9/00; G05D 1/02; G05D 1/00; G05D 3/00; G05D 5/00; G05D 7/00; G05D 9/00; G05D 11/00; G05D 13/00; G05D 15/00; G05D 16/00; G05D 17/00; G05D 21/00; G05D 19/00; G05D 22/00; G05D 23/00; G05D 24/00; G05D 25/00; G05D 27/00; G05D 29/00; G05D 99/00; G05D 1/0274; G05D 1/0088; G05D 1/0223; G05D 2201/0203; G05D 1/0212; G01C 11/04; G01C 21/04; G01C 7/04; G06K 9/32; G06K 1/00; G06K 3/00; G06K 5/00; G06K 7/00; G06K 9/00; G06K 11/00; G06K 13/00; G06K 15/00; G06K 17/00; G06K 19/00; G06K 21/00
See application file for complete search history.

(56) References Cited

U.S. PATENT DOCUMENTS

| | | |
|---|---|---|
| 8,532,860 B2 | 9/2013 | Daly |
| 8,676,430 B1 | 3/2014 | Ferguson et al. |
| 8,679,260 B2 | 3/2014 | Hillman, Jr. et al. |
| 8,958,937 B2 | 2/2015 | Hillman, Jr. et al. |
| 9,028,617 B2 | 5/2015 | Balas et al. |
| 2011/0108064 A1 | 5/2011 | Hillman, Jr. et al. |
| 2011/0153136 A1 | 6/2011 | Anderson |
| 2016/0103451 A1 | 4/2016 | Vicenti |
| 2020/0064857 A1* | 2/2020 | Gagne .................. A47L 11/4011 |
| 2020/0225655 A1* | 7/2020 | Cella ..................... G06N 3/0472 |
| 2020/0284883 A1* | 9/2020 | Ferreira ................ G01S 7/4816 |
| 2020/0348662 A1* | 11/2020 | Cella .................... G05B 23/024 |
| 2021/0157312 A1* | 5/2021 | Cella .................... G06K 9/6263 |

* cited by examiner

ROBOTIC CLEANING DEVICE WITH OPERATING SPEED VARIATION BASED ON ENVIRONMENT

RELATED APPLICATIONS AND CLAIM OF PRIORITY

This application is a national stage application of, and claims priority to, International Patent Application No. PCT/US2017/065296, filed Dec. 8, 2017, which claims priority to U.S. Provisional Patent Application No. 62/432,116, filed Dec. 9, 2016, and U.S. Provisional Patent Application No. 62/595,317, filed Dec. 6, 2017, the disclosures of which are each incorporated herein by reference in their entirety.

BACKGROUND

Mobile robotic devices have reduced the human effort required to perform many everyday tasks. For example, automatic cleaning devices help maintain and clean surfaces, such as hardwood floors, carpet and the like. An example of such as device is disclosed in U.S. Pat. No. 9,028,617, titled "Cleaning Device with Single Tank Recycling System," which is fully incorporated into this document by reference.

Customers who use such devices to clean floors wish to have the machines perform their cleaning tasks in the shortest possible amount of time. This requires increased travel speeds for the cleaning devices. However, increased travel speeds can increase the risk of collision with obstacles if the device is unable to stop before the device reaches the obstacle. Increased speeds can also increase the risk that the device will not properly clean, or that it will tip over, if the device is required to make a sudden turn to avoid an obstacle.

This document describes methods and systems that are intended to improve the overall time required for a robotic cleaning devices to safely clean a facility.

SUMMARY

In accordance with an aspect of the disclosure, a method of causing a robotic device to navigate an area is disclosed. The method includes, by a processor, accessing a set of map data for an area within which a robotic device will travel, wherein the set of map data includes information regarding positions of obstacles boundaries in the area, and causing a transport assembly of the robotic device to move the robotic device in the area at a first speed of movement. By at least one sensor that is integral with the robotic device, the method also includes collecting sensor data about the area as the robotic device moves in the area. The method further includes comparing the sensor data with the information regarding the area from the set of map data, and determining a degree of confidence in the sensor data, wherein the degree of confidence represents a measurement of an extent to which the sensor data matches the information regarding positions of obstacles one or more boundaries in the area from the set of map data. When the determined degree of confidence is at or below a first threshold degree of confidence, the method includes implementing a first reduced speed mode of operation by causing the transport assembly of the robotic device to move at a second speed of movement, wherein the second speed of movement is lower than the first speed of movement.

In accordance with another aspect of the disclosure, another method of causing a robotic cleaning device to navigate an area is disclosed. The method includes, by a processor, accessing a set of map data for an area within which the robotic cleaning device will travel, and causing a transport assembly of the robotic cleaning device to move the robotic device in the area at a first speed of movement. By at least one sensor that is integral with the robotic cleaning device, the method includes collecting sensor data about the area as the robotic device moves in the area. The method further includes determining a virtual boundary around a location of a centroid of the robotic cleaning device and, based on the sensor data, determining that the robotic cleaning device has not moved outside of the virtual boundary within a time period. In response to determining that the robotic cleaning device has not moved outside of the virtual boundary within the time period, the method includes implementing a stop command that causes a transport assembly of the robotic cleaning device to stop movement of the robotic cleaning device and/or causes a cleaning assembly or fluid delivery system of the robotic cleaning device to stop operation.

According to another aspect of the disclosure, another method of causing a robotic device to navigate an area is disclosed. The method includes, by a processor, accessing a set of map data for an area within which a robotic device will travel, wherein the set of map data includes information regarding positions of one or more boundaries in the area, and causing a transport assembly of the robotic device to move the robotic device in the area. By at least one sensor that is integral with the robotic device, the method includes collecting sensor data about the area as the robotic device moves in the area, and using the sensor data to determine whether the robotic device is about to arrive at a location in the area more than a threshold number of times within a time period. If the robotic device is about to arrive at the location in the area more than a threshold number of times within the time period, the method includes causing the transport assembly of the robotic device to alter a path of travel of the robotic device so that the robotic device does not arrive at the location more than the threshold number of times within the time period.

In accordance with another aspect of the disclosure, another method of causing a robotic cleaning device to navigate an area is disclosed. The method includes, by a processor of a robotic cleaning device, causing a transport assembly to move the robotic cleaning device in a first area at a maximum speed of movement and, by a sensor that is integral with a robotic cleaning device, collecting information about the first area as the robotic cleaning device moves in the first area. The method further includes processing the information to detect that the robotic cleaning device is approaching a second area that includes one or more boundaries. When the processed information indicates that the robotic cleaning device is within a first threshold distance from the one or more boundaries of the second area, the method includes implementing a first reduced speed mode of operation by causing the transport assembly of the robotic cleaning device to move at a first reduced speed of movement, and causing an additional element of the robotic cleaning device to reduce its speed of operation by a first amount.

According to another aspect of the disclosure, a mobile robotic system is disclosed. The mobile robotic system includes, a mobile robotic device and one or more sensor assemblies, wherein the one or more sensor assemblies comprise one or more sensors. The mobile robotic system also includes a processing device and a non-transitory, computer-readable medium containing programming instructions. The programming instructions are configured to cause the processing device to access a set of map data for an area within which the mobile robotic device will travel, wherein the set of map data includes information regarding positions of boundaries in the area, cause a transport assembly of the mobile robotic device to move the mobile robotic device in the area at a first speed of movement, collect data from the one or more sensors about the area as the mobile robotic device moves in the area, compare the data from the one or more sensors with the information regarding positions of boundaries in the area from the set of map data, and determine a degree of confidence in the data from the one or more sensors, wherein the degree of confidence represents a measurement of an extent to which the data from the one or more sensors matches the information regarding the positions of one or more boundaries in the area from the set of map data.

In accordance with another aspect of the disclosure, another mobile robotic system is disclosed. The mobile robotic system includes a mobile robotic device having a transport assembly, and one or more sensor assemblies, wherein the one or more sensor assemblies comprise one or more sensors. The mobile robotic system also includes a processing device and a non-transitory, computer-readable medium containing programming instructions. The programming instructions are configured to cause the processing device to access a set of map data for an area within which the mobile robotic device will travel, cause a transport assembly of the mobile robotic device to move the mobile robotic device in the area at a first speed of movement, collect sensor data from the one or more sensors about the area as the mobile robotic device moves in the area, determine a virtual boundary around a location of a centroid of the mobile robotic device, determine, using the sensor data, if the mobile robotic device has moved outside of the virtual boundary within a time period, and, in response to determining that the mobile robotic device has not moved outside of the virtual boundary within the time period, implement a stop command that causes the transport assembly of the mobile robotic device to stop movement of the mobile robotic device.

According to another aspect of the disclosure, another mobile robotic system is disclosed. The mobile robotic system includes a mobile robotic device and one or more sensor assemblies, wherein the one or more sensor assemblies comprise one or more sensors. The mobile robotic system also includes a processing device and a non-transitory, computer-readable medium containing programming instructions. The programming instructions are configured to cause the processing device to access a set of map data for an area within which the mobile robotic device will travel, wherein the set of map data includes information regarding positions of boundaries in the area, cause a transport assembly of the robotic device to move the mobile robotic device in the area, collect sensor data about the area from the one or more sensors as the mobile robotic device moves in the area, use the sensor data to determine whether the mobile robotic device is about to arrive at a location in the area more than a threshold number of times within a time period, and if the mobile robotic device is about to arrive at the location in the area more than a threshold number of times within the time period, cause the transport assembly of the mobile robotic device to alter a path of travel of the mobile robotic device so that the mobile robotic device does not arrive at the location more than the threshold number of times within the time period.

In accordance with another aspect of the disclosure, a robotic cleaning system is disclosed. The robotic cleaning system includes a robotic cleaning device having a transport assembly, and one or more sensor assemblies, wherein the one or more sensor assemblies comprise one or more sensors. The robotic cleaning system also includes a processing device and a non-transitory, computer-readable medium containing programming instructions. The programming instructions are configured to cause the processing device to cause the transport assembly to move the robotic cleaning device in a first area at a maximum speed of movement, collect sensor data from the one or more sensors about the first area as the robotic cleaning device moves in the first area, use the sensor data to detect that the robotic cleaning device is approaching a second area that includes one or more boundaries, and, when the sensor data indicates that the robotic cleaning device is within a first threshold distance from the one or more boundaries of the second area, implement a first reduced speed mode of operation by causing the transport assembly of the robotic cleaning device to move at a first reduced speed of movement and causing an additional element of the robotic cleaning device to reduce its speed of operation by a first amount.

DETAILED DESCRIPTION

In this document, the singular forms "a," "an," and "the" include plural references unless the context clearly dictates otherwise. In this document, the term "comprising" means "including, but not limited to." Unless defined otherwise, all technical and scientific terms used in this document have the same meanings as commonly understood by one of ordinary skill in the art.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed.

The claims are intended to include all orientations of a device containing such components.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

A "robot" or "robotic device" is a system that is capable of autonomous movement and that performs both physical and computational activities. The physical activities may be performed using a wide variety of movable parts including various tools, such as scrub brushes, liquid applicators and vacuum systems in a robotic cleaning device. The computational activities may be performed using a suitable processor and computer readable memory devices that are part of the robot, that are external to the robot on a system that communicates with the robot by a communication signal delivered via communication technologies such as Wi-Fi, short range communication, or near field communication. The computational activities may include processing information input from various sensors or other inputs of the robotic device to perform commanded functions such as vacuuming, scrubbing, or applying water or cleaning solution to a floor.

Figure 1:
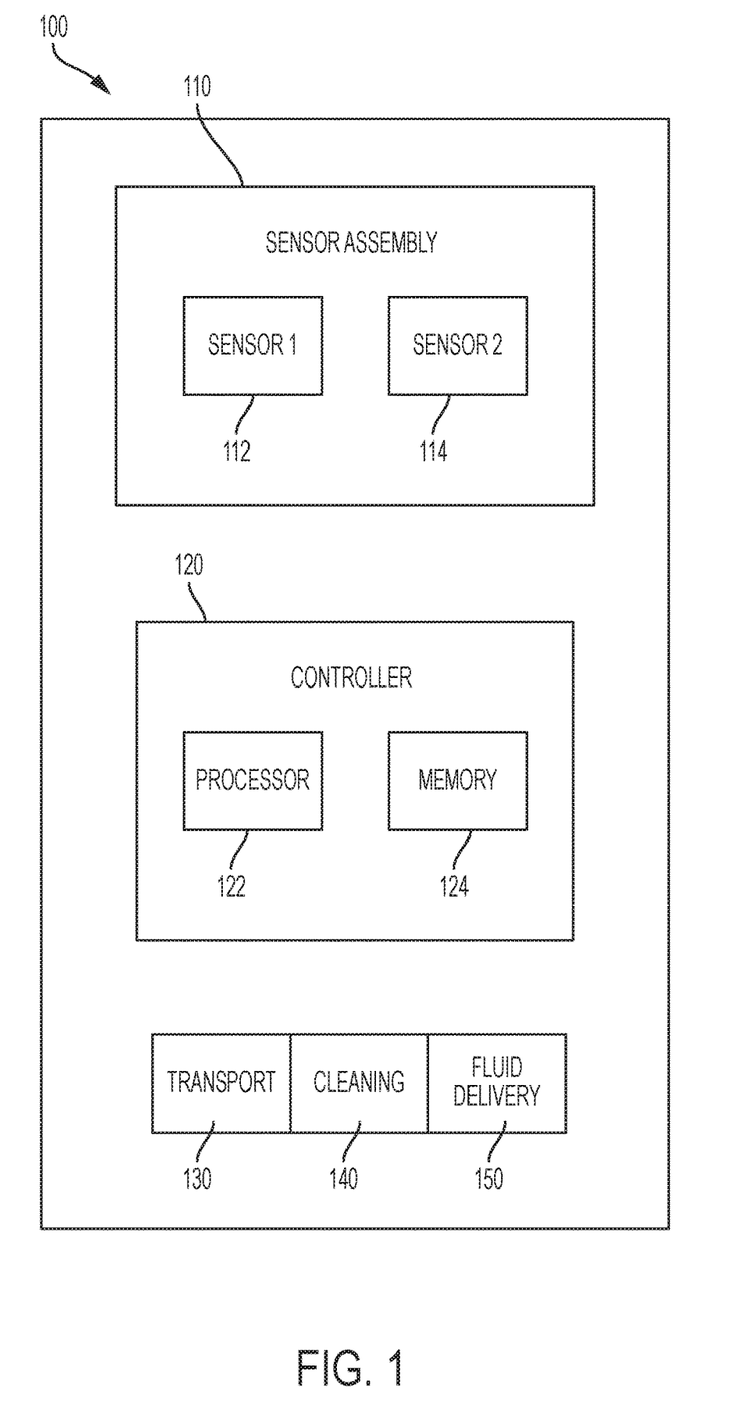
FIG. 1 is a block diagram showing a mobile robotic device according to an embodiment.

FIG. 1 is a block diagram showing a mobile robotic device 100 in accordance with one embodiment of the present disclosure. As shown in FIG. 1, the robotic device 100 may include a sensor assembly 110, a controller 120 operably connected to the sensor assembly, and a transport assembly 130 operably connected to the controller. When the robotic device is a cleaning device, it may also include elements such as a cleaning assembly 140 and a fluid delivery system 150. It should be noted that the elements as shown in FIG. 1 are shown by way of example only. Additional information related to robotic devices is shown in U.S. Pat. No. 6,667,592, titled "Mapped Robot System," the content of which is fully incorporated into this document by reference.

The sensor assembly 110 may include various components such as a first sensor assembly 112 and a second sensor assembly 114, which assemblies may include a sonar assembly, a LIDAR assembly, and/or other various sensor mechanisms such as other laser-based sensors, global positioning system (GPS) devices, microwave sensors, cameras, gyroscopes, infrared (IR) sensors, structured light sensors such as structured light cameras and 3D structured light scanners, stereo cameras and other sensors that are capable of capturing information about the environment in which the robot is operating. Any combinations of these sensors may be used, and the sensors may be placed in various locations on the robotic device, such as its front, rear, or sides. The sensors will collect information about the mobile robotic device's surroundings such as coordinates, navigational information, visual information and/or the like. This document may refer to data collected by one or more of the sensors as "sensor data." For example, if the sensor assembly includes a sonar assembly, the system may include a tunable ultrasonic piezoelectric transducer configured to transmit sound at a desired pressure level, and to receive reflected sound so that the processor may use the reflected signals to calculate a distance between the robot and an obstacle such as a wall.

If the sensor assembly includes a camera, the device may process received images to locate one or more substantially straight lines in the image that may be representative of a boundary that is formed by a wall, a step up or down, a transition between flooring types, or another obstacle or edge. For example, a video camera may be able to detect a corner where an aisle of a store or storage facility meets an intersecting aisle. Similarly, a video camera may be able to detect an edge based on a variation in floor type, such as by color contrast. The mobile robotic device may use this information, optionally with information from other sensors of the device to determine its position relative to the detected edge. For example, a mobile robotic device may compare information about its current position, such as its coordinates, heading and/or the like, with information received from the video camera regarding the edge. The mobile robotic device may use this comparison to determine its position relative to the edge, its distance away from the edge and/or the like.

The controller 120 may include a processor 122 and a computer-readable medium 124 such as a hard drive, an optical drive, a flash drive, a read-only memory or a random access memory containing programming instructions that are configured to cause the processor 122 to process information and control the other elements of the robot.

The transport assembly 130 includes a mechanical system that is configured to move the robotic device from one place to another, such as a motor, drive system, and set of wheels, rollers, or the like. The speed of the robotic device may be determined via, for example, optical encoders associated with the wheels, rollers, etc. However, other means of determining the speed of the robotic device are also contemplated.

The cleaning assembly 140 will include cleaning elements that contact, dislodge and/or draw particles from the floor to clean the floor. Examples of such cleaning elements include a cleaning head with and a scrubber, a squeegee, a vacuum system, and one or more motors to activate these elements.

The fluid delivery system 150 will include one or more tanks for holding fresh water and/or cleaning solution that is directed to the floor scrubber and/or other components of the cleaning assembly, and/or used water and/or cleaning solution that the cleaning assembly withdraws from the floor after application. The fluid delivery system 150 also will include elements for directing fluid to, and withdrawing fluid from, the floor such as filter, a discharge line, and a pump.

The components of the robotic device 100 as described may be configured to perform a wide variety of operations.

The robotic device may include a processor 122 that is configured to monitor and control various operations of the robotic device 100. The robotic device also may include a memory device 124 configured to store a variety of programming instructions and/or data used by the processor 122 as well as the other components of the robotic device 100.

The block diagram of FIG. 1 illustrates various operating components of the robotic device 100. It should be appreciated that the operating components of the robotic device 100, or select operating components of the robotic device 100, may be encased or enclosed in a suitable body or body portion. Alternatively, it should be appreciated that the operating components of the robotic device 100 may simply be suitably disposed on a support framework or structure.

Figure 2:
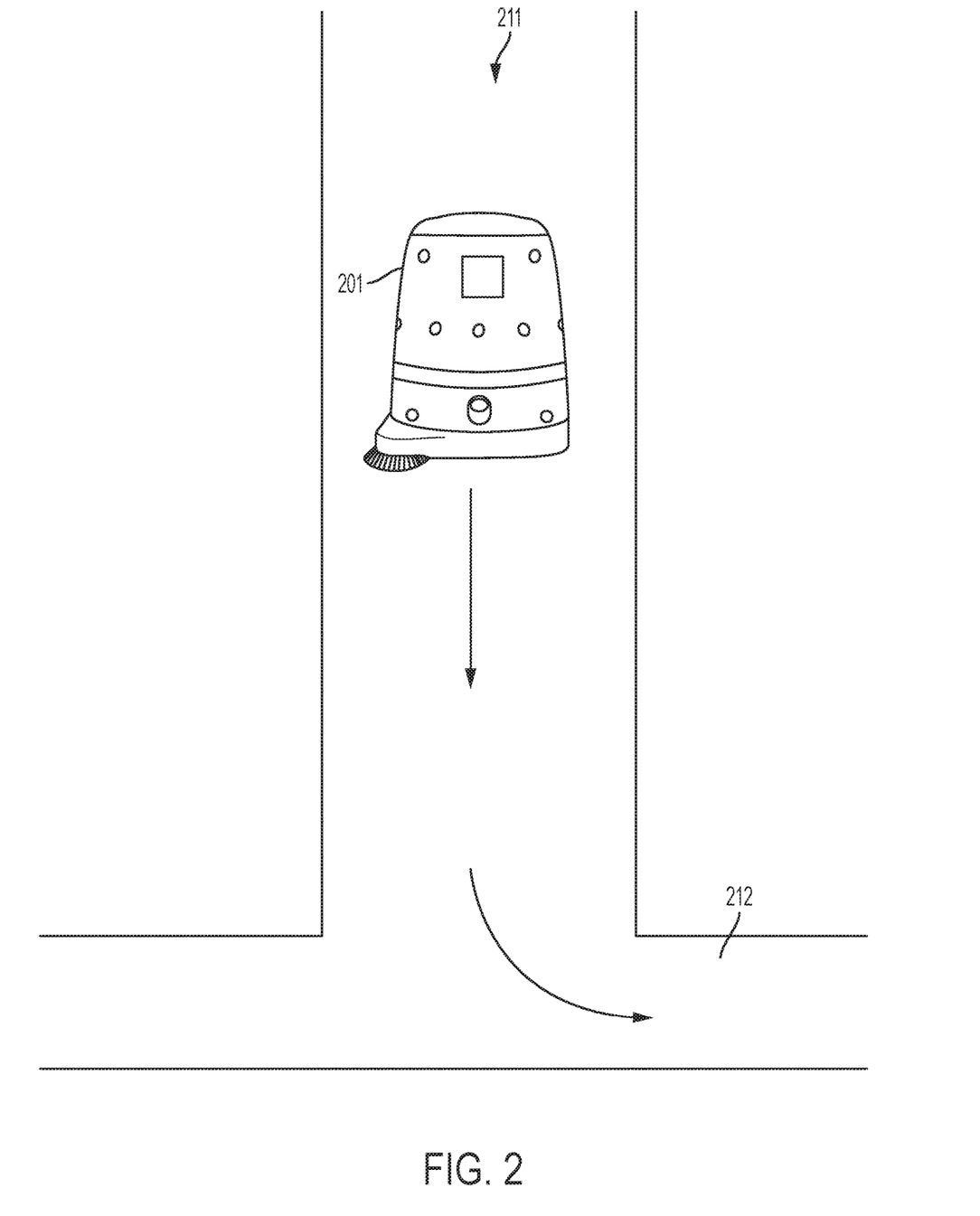
FIG. 2 illustrates an example method of navigating a mobile robotic device according to an embodiment.

FIG. 2 illustrates an example method of navigating a mobile robotic device according to an embodiment. As illustrated by FIG. 2, a mobile robotic device 201 may move through a first area 211 that is bounded by sidewalls. The first area may be a hallway, a room, an aisle, or other layout, and the sidewalls may be permanent walls or other structures such as shelving or storage units, cubicles, or even open areas that are designated as an aisle or similar area for movement, optionally such as by markings on the floor. The first area 211 may intersect with a second area 212, and the device's cleaning protocol may require the device 201 to turn and clean the second area 212 in either direction upon reaching the intersection.

To detect the intersection, the system may rely on information received from its various sensors. For example, if the robotic device includes a video camera positioned on its top or front (i.e., in a forward-facing direction, with "front" in this embodiment being a position facing the robotic device's direction of movement), the system may receive images and detect a line representing a wall in front of it. The information may include values associated with the slope, the intercept and/or the error of a line detected by the video camera. For example, the slope, intercept and/or error associated with a substantially straight line from an image of a surface, such as a ground surface, a floor surface or other surface over which the mobile robotic device is travelling may be provided to the mobile robotic device. In an embodiment, the video camera may continuously capture images, and the processor may continuously process the images to update information as the robotic device moves in its area. For example, the processor may continue to process received images to update slope values, intercept values and/or error values associated with a detected line several times per second.

In an embodiment, a mobile robotic device may use this information to determine its position relative to the detected edge. For example, a mobile robotic device may compare information about its current position, such as its coordinates, heading and/or the like, with information received from the video camera regarding the edge. The mobile robotic device may use this comparison to determine its position relative to the edge, its distance away from the edge and/or the like. Other sensor data, such as sonar or LIDAR data, may also be used to detect one or more edges the area.

Figure 3:
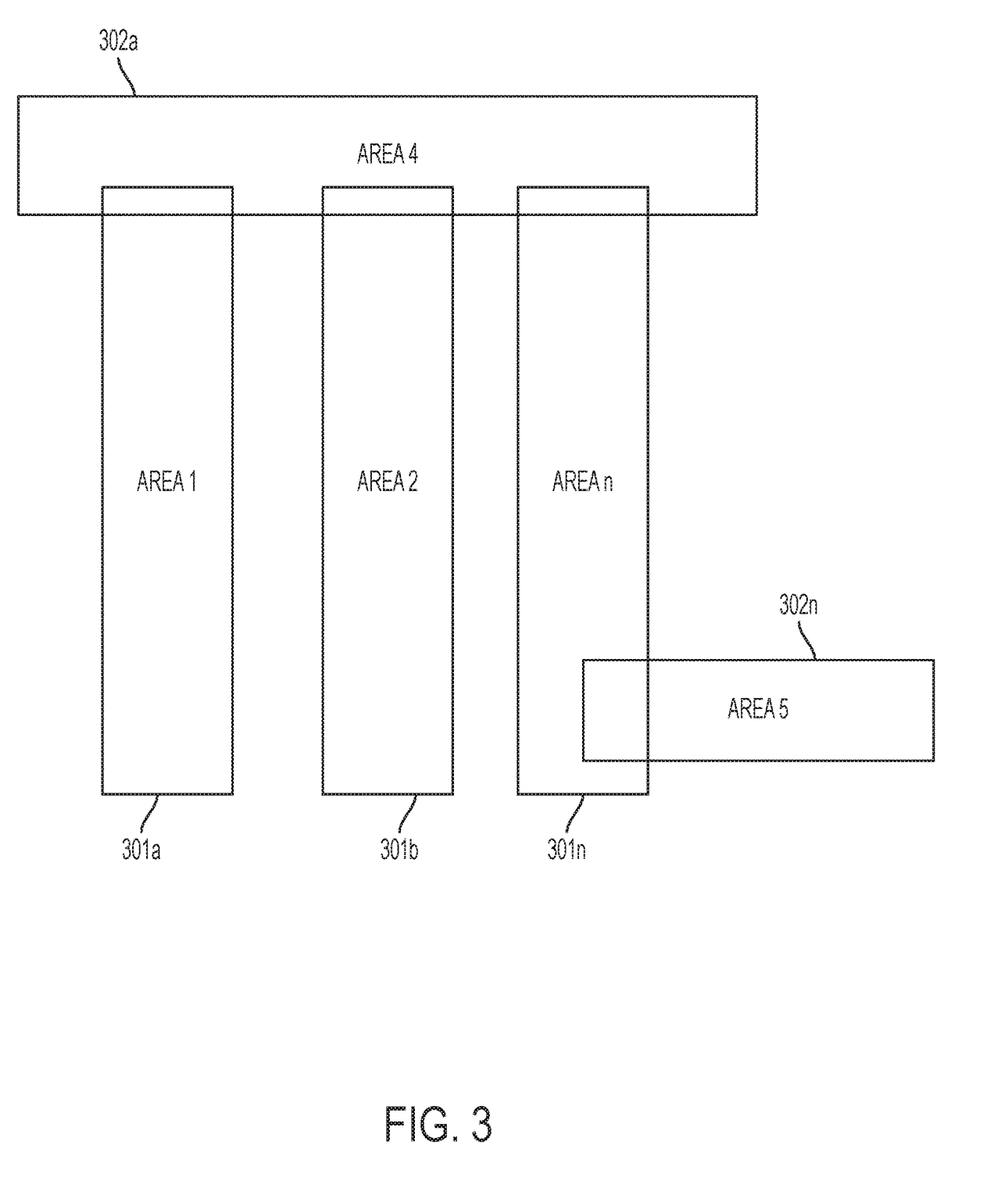
FIG. 3 illustrates an example method of cleaning an area with an automatic cleaning device according to an embodiment.

The system also may compare received data to stored map data as it navigates a predetermined or real-time-determined path to identify its position in a facility with respect to detected or known boundaries. The map data may be stored on the robotic device or in a remote electronic device that is in electronic communication with the robotic device. An example of a set of stored map data is shown in graphic form in FIG. 3. As FIG. 3 shows, the system may store a digital representation of a map of a storage facility with a set of aisles 301*a* . . . 301*n* and intersecting raceways 302 . . . 302*n* that are perpendicular to the aisles and that provide a path between one or more groups of aisles. The map of the storage facility may be pre-programmed into the computer-readable medium 124, or, alternatively, the map may be developed via sensor readings as the device moves through aisles 301*a* . . . 301*n* and intersecting raceways 302 . . . 302*n*. Based on the known boundaries (e.g., intersections and/or obstacles) in the aisle, the stored information in the map enables the device to preemptively reduce speed as it approaches the boundary. Such a reduction in speed not only aids in avoiding collisions with known objects or obstacles at intersection junctures, but it also provides for reduced travel speeds as the device enters intersections where unseen/undetected obstacles (such as other traveling machinery, walking humans, etc.) may be traveling along the intersecting raceways 302.

In an embodiment, a mobile robotic device may utilize both stored map information and detected sensor information in order to navigate the aisles of the storage facility and control speeds of the device at various locations within the facility. For example, the device may primarily rely on stored map information to dictate speed changes within the aisles and at each intersection. However, the device may further rely on sensor information in order to control the speed of the device based on unknown or unexpected obstacles. For example, sensor information may be used to reduce the travel speed of the mobile robotic device if an obstacle or other boundary is detected within the center of an aisle, where the stored map information would normally indicate that the travel speed of the mobile robotic device should be at its highest.

In an embodiment, a robotic cleaning device may adjust the speed by which its transport assembly, cleaning assembly, and/or fluid delivery system operates based on its proximity to a detected boundary at which it will turn. The device's transport assembly may move the device at a first speed when no boundary is detected within a first threshold distance from the device in the direction toward which the device is moving. The first speed may be a maximum operating speed, so that the device moves most quickly when no boundaries are within the first threshold.

In addition to adjusting speeds at detected boundaries or turning locations, the robotic cleaning device may also adjust one or more operational speeds based on proximity to objects such as permanent walls or other structures (e.g., shelving or storage units, cubicles, etc.) which run longitudinally along one or more respective sides of the aisle. For example, the device may move at the first speed (e.g., a maximum operating speed) when traveling down the center of the aisle, away from any boundaries. However, as the device travels near one of the sides of the aisle (and, thus, near the permanent walls or other structures), the speed may be reduced to a second, moderate operating speed. And when the device travels along or directly adjacent the permanent walls or other structures, the device may travel at a third speed even lower than the second, moderate operating speed.

When the device detects an obstacle or intersection within the first threshold distance, the transport assembly will reduce the speed of the device's movement toward the boundary by a first level, so that the device operates in a first reduced speed mode. The device may then continue to monitor the environment and identify when the device determines that the boundary is with a second threshold distance from the device. (The second threshold distance will be closer to the device than the first threshold distance.)

When the device detects the boundary within the second threshold distance, the transport assembly will further reduce the speed of the device's movement toward the boundary by a second level, so that the device operates at a second reduced speed mode that is slower than the first reduced speed mode. This process of successive distance thresholds and speed reduction may either continue until the device stops short of the boundary, or until the device is within a turning distance of the boundary and completes a turn to move into the second area.

In addition to changing speeds of the transport assembly, other elements of the device may operate more slowly in the first, second, and additional reduced speed modes. For example, when the device enters the first reduced speed mode, the device's cleaning assembly may reduce the speed by which its brushes are rotated or otherwise moved, or the pressure at which its vacuum operates. Similarly, the device's fluid delivery system may reduce the flow rate at which it applies fluid to the floor, or other elements of its operation. When the device enters the second reduced speed mode, the device's cleaning assembly and fluid delivery system may further reduce the speed of any or all of these aspects of operation.

Figure 4A:
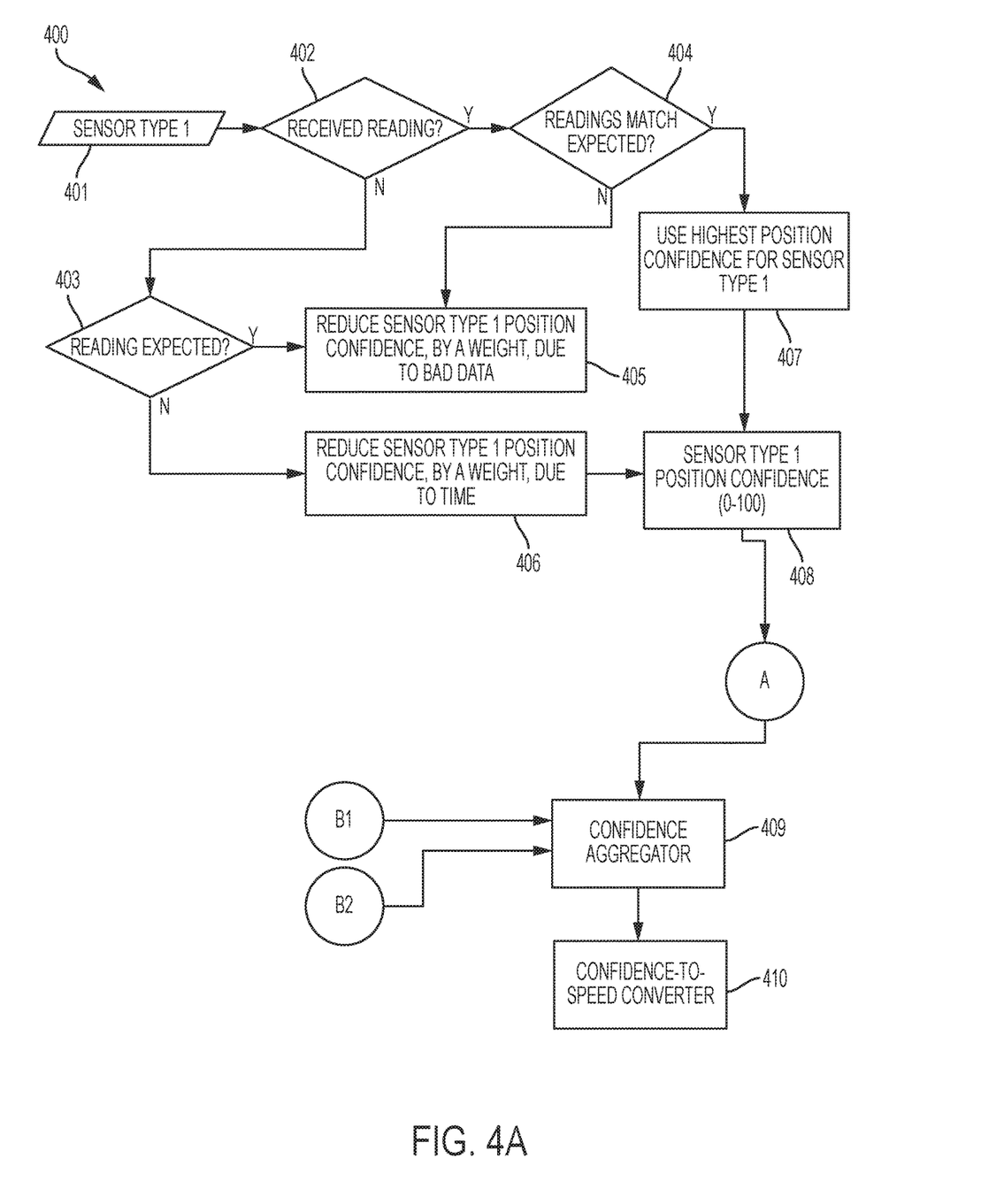
FIGS. 4A-B illustrate a flowchart of a method of determining a speed of operation of a mobile robotic device according to another embodiment.
Figure 4B:
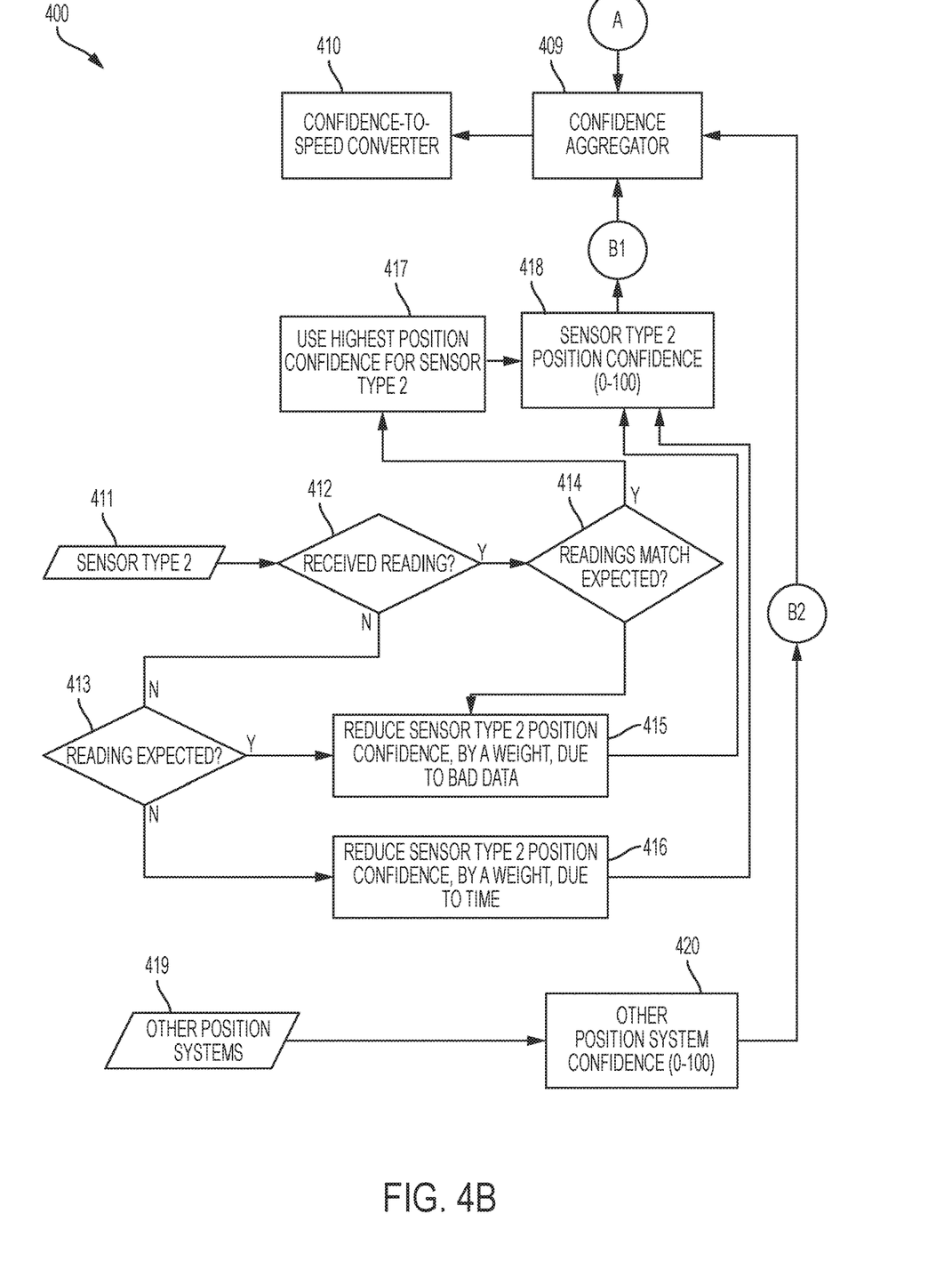

Next, referring to FIGS. 4A and 4B, a method of adjusting travelling and/or effector speed of the robotic device in accordance with another aspect of the disclosure is shown. As noted above with respect to FIG. 3, the robotic device may be configured to travel through a known area, with the known area being stored as a pre-programmed map on a computer-readable medium within (or in communication with) the robotic device. The map may identify known boundaries such as, e.g., areas near pillars, walls, shelves, ledges, intersections, etc., allowing the robotic device to travel at appropriate, reduced speeds when near such known boundaries, while operating at higher speeds when separated by predetermined distances from those known boundaries.

Although the robotic device may travel within a known area, the precise position of the robotic device in relation to such an area may only be determinable by various sensors on the device, such as, e.g., a sonar assembly, a LIDAR assembly, a laser-based sensor, a global positioning system (GPS) device, a microwave sensor, a camera, a gyroscope, and/or other sensors that are capable of capturing information about the environment in which the robot is operating. However, even when traveling through a known area, the readings obtained by the various sensors on the device may not concur with known boundaries identified on the map, or no readings may be obtained at all. In such instances, and in accordance with another aspect of the disclosure, a degree of confidence in the position of the robotic device may be determined, with the speed of the robotic device not only dictated by detected boundaries, but also dictated by a degree of confidence (referred to herein as a confidence-in-position score) relative to a known area.

Referring again to FIGS. 4A and 4B, a method 400 of determining robotic device speed adjustments based on a degree of confidence in the position of the robotic device is illustrated. As disclosed above, the robotic device may include various sensor types, such as, e.g., sonar, LIDAR, GPS, camera(s), etc. In method 400, a first sensor 401 (Sensor Type 1) is identified, and a determination is made (at step 402) as to whether or not a reading from first sensor 401 is received. If yes, a determination is made (at step 404) whether or not the received reading matches an expected reading as identified by the known map. If yes, the highest level of confidence-in-position score may be used for the Sensor Type 1 (at step 407). For example, at step 408, the Sensor Type 1 confidence-in-position score may be "100" on a general scale of 0-100, indicating the highest level of confidence-in-position due to the received readings from Sensor Type 1 matching the expected readings as identified by the map.

However, if no reading from the first sensor is received at step 402, a determination is made (at step 403) as to whether or not any reading is expected based on the known details of the stored map. If yes, a reading was expected, the confidence-in-position score of Sensor Type 1 is reduced (at step 405) by a weight due to assumed "bad" data received by, or provided from, Sensor Type 1. A similar reduction in the confidence-in-position score of Sensor Type 1 may also be made if, at step 404, the received readings from Sensor Type 1 do not match expected readings as identified by the map.

The weight may be dictated by the perceived importance or accuracy of a particular sensor type. For example, Sensor Type 1 may by a GPS sensor, which may be identified as a particularly relevant sensor type in terms of determining positional confidence relative to a known area. Thus, the weighted reduction in confidence-in-position score due to bad data from the GPS sensor may be such that the Sensor Type 1 confidence-in-position score is reduced to "0" on a scale of 0-100 at step 408. However, it is to be understood that various weighted reductions in confidence-in-position score may be utilized, either dependent upon the specific type of sensor or other factors. The weight may be predetermined based on the particular sensor type, or the weight may be dynamically adjustable. Furthermore, it is also to be understood that the illustrated confidence-in-position scale of 0-100 is merely one example, and that any appropriate scale may be utilized.

Referring again to step 403, if a reading from Sensor Type 1 was both not received and not expected based on known information from the stored map, a weighted reduction in the confidence-in-position score of Sensor Type 1 may also be made at step 406 due to an elapsed predetermined amount of time. That is, the robotic device may be travelling through a particular portion of the known area where no sensor feedback is expected, but it is assumed that the device will eventually enter an area where sensor feedback should be present. Thus, if Sensor Type 1 does not provide a reading after a predetermined period of time has elapsed, the confidence-in-position score may be reduced, even if such a reading was not previously expected. The reduction in confidence-in-position score for under this scenario may be less than the reduction provided at step 405 due to bad data from the Sensor Type 1, as the map would not definitively verify an expected reading. For example, as opposed to a confidence-in-position score being reduced to "0" on a scale of 0-100 due to bad data, the confidence-in-position score may be reduced to, e.g., "50", due to elapsed time without a reading. Thus, while still reduced, the system's confidence-in-position is higher than if known bad (or inconsistent) data from Sensor Type 1 was received.

In addition to first sensor 401 (Sensor Type 1), the robotic device may have an additional, second sensor 411 (Sensor Type 2), along with other position systems/sensors 419. Similar to first sensor 401, for second sensor 411, a determination is made (at step 412) as to whether or not a reading from second sensor 411 is received. If yes, a determination is made (at step 414) whether or not the received reading matches an expected reading as identified by the known map. If yes, the highest level of confidence-in-position score may be used for the Sensor Type 2 (at step 417). For example, at step 418, the Sensor Type 2 confidence-in-position score may be "100" on a general scale of 0-100, indicating the highest level of confidence-in-position due to the received readings from Sensor Type 2 matching the expected readings as identified by the map.

However, if no reading from the second sensor 411 is received at step 412, a determination is made (at step 413) as to whether or not any reading is expected based on the known details of the stored map. If yes, a reading was expected, the confidence-in-position score of Sensor Type 2 is reduced (at step 415) by a weight due to bad data received by Sensor Type 2. A similar reduction in the confidence-in-position score of Sensor Type 2 may also be made if, at step 414, the received readings from Sensor Type 2 do not match expected readings as identified by the map.

Referring again to step 413, if a reading from Sensor Type 2 was both not received and not expected based on known information from the stored map, a weighted reduction in the confidence-in-position score of Sensor Type 2 may also be made at step 416 due to an elapsed predetermined amount of time. That is, if Sensor Type 2 does not provide a reading over a certain period of time, the confidence-in-position score may be reduced, even if such a reading was not necessarily expected.

Readings from additional position systems/sensors 419 may also be analyzed in substantially the same way as that of first sensor 401 and second sensor 411 described above and, although not shown in FIG. 4, the confidence-in-position scores related to those additional systems/sensors may be appropriately weighted in order to determine other confidence-in-position scores on a scale of 0-100 at step 420.

At step 409, the confidence-in-position scores related to each sensor type are aggregated, determining a final confidence-in-position score. Depending on the final, aggregated confidence-in-position score, the travelling speed of the robotic device is converted at step 410 to account for the system's confidence in the device's position within a known area. For example, if the aggregated confidence-in-position score is "50" on a scale of 0-100, the robotic device's travelling speed may be reduced to half of a maximum travelling speed, thereby allowing the device more time to adequately react to undetected, unknown, or unexpected obstacles in its path. Additionally and/or alternatively, if the aggregated confidence-in-position score is at or near "0" on a scale of 0-100, the robotic device may be entirely disabled, and an alert and/or error code may be generated, indicating that one or more sensor(s) of the robotic device have either malfunctioned or the map of the known area of travel is outdated and/or incorrect.

The system may use any suitable algorithm for determining the final confidence-in-position score 409. For example, the system may simply determine the confidence-in-position score as the average of each of the sensor position confidence scores (as determined in steps 408 and 418, as well as in similar steps for any other sensors that the system may incorporate into its position determination process). Optionally, one or more of the individual sensors' scores may be adjusted by a weight based that sensor's assigned degree of importance. The weight may be predetermined for each sensor, or the weights may vary and be selected from a memory corresponding to certain data that is detected by one or more of the sensors. The system may use other algorithms to determine the confidence-in-position score.

The readings from all system sensors may be continuously monitored in accordance with method 400. Accordingly, even if the confidence-in-position scores are reduced to a level in which speed of the device is also reduced, the system may continuously determine confidence-in-position based on various sensor readings, and may increase the speed of the device based on higher concurrence of expected sensor readings, etc.

In some environments, one type of sensor may provide expected readings (and thus a high confidence-in-position score), while other type(s) of sensors may provide unexpected or non-existent readings. For example, if the robotic device is travelling along or near a glass wall, an on-board LIDAR sensor system might not detect the wall, while an on-board sonar system would detect the wall. In such a scenario, method 400 described above allows the robotic device to continue travelling through the known area, albeit at a reduced speed due to inconsistent sensor readings. In this way, all sensor readings may be taken into account in determining an operational speed of the device.

Based on the varying degrees of positional confidence as defined by the confidence-in-position scores, the robotic device may employ a series of confidence thresholds which delineate changes in device transport and/or cleaning equipment operating speed. For example, in some environments, an aggregated confidence-in-position threshold score of 80 or above (out of 100) may allow the robotic device to travel and clean at the highest speed. A second confidence-in-position threshold score between, e.g., 50-80, may allow the device to travel and clean at a reduced speed, e.g., half of the highest rated speed. And finally, a third confidence-in-position threshold score of, e.g., below 50 may cause the device to stop traveling and cleaning completely. It is to be understood that the thresholds may be adjusted higher or lower based on environment, top device speeds, etc., and more or fewer thresholds (and speed variations) may be utilized.

Furthermore, if the robotic device is stopped due to a low degree in confidence-in-position (or any other reason), one or more alerts may be emitted to notify an operator that the device is immobilized. For example, one or more of an audible alert may be emitted directly by the robotic device, an audible alert may be emitted remote from the robotic device, a visual alert may be emitted directly by the robotic device, or a visual alert may be emitted remote from the robotic device.

Also, while not shown in FIG. 4, the system may be configured to determine an amount of elapsed time that the degree of confidence (i.e., confidence-in-position score) for one or more sensors is at or below the certain threshold degree of confidence. If the amount of time at or below a certain threshold is greater than a predetermined time (e.g., 30 seconds), the system may incrementally lower the confidence-in-position score, thereby further reducing speed of movement of the robotic device as the amount of time increases. In this way, continued operation at or below a particular threshold degree of confidence will cause the robotic device to continually slow, as the likelihood of a collision or other incident may increase simply due to the greater amount of time spent operating under a lower than optimal degree of confidence in the device's position.

Figure 5:
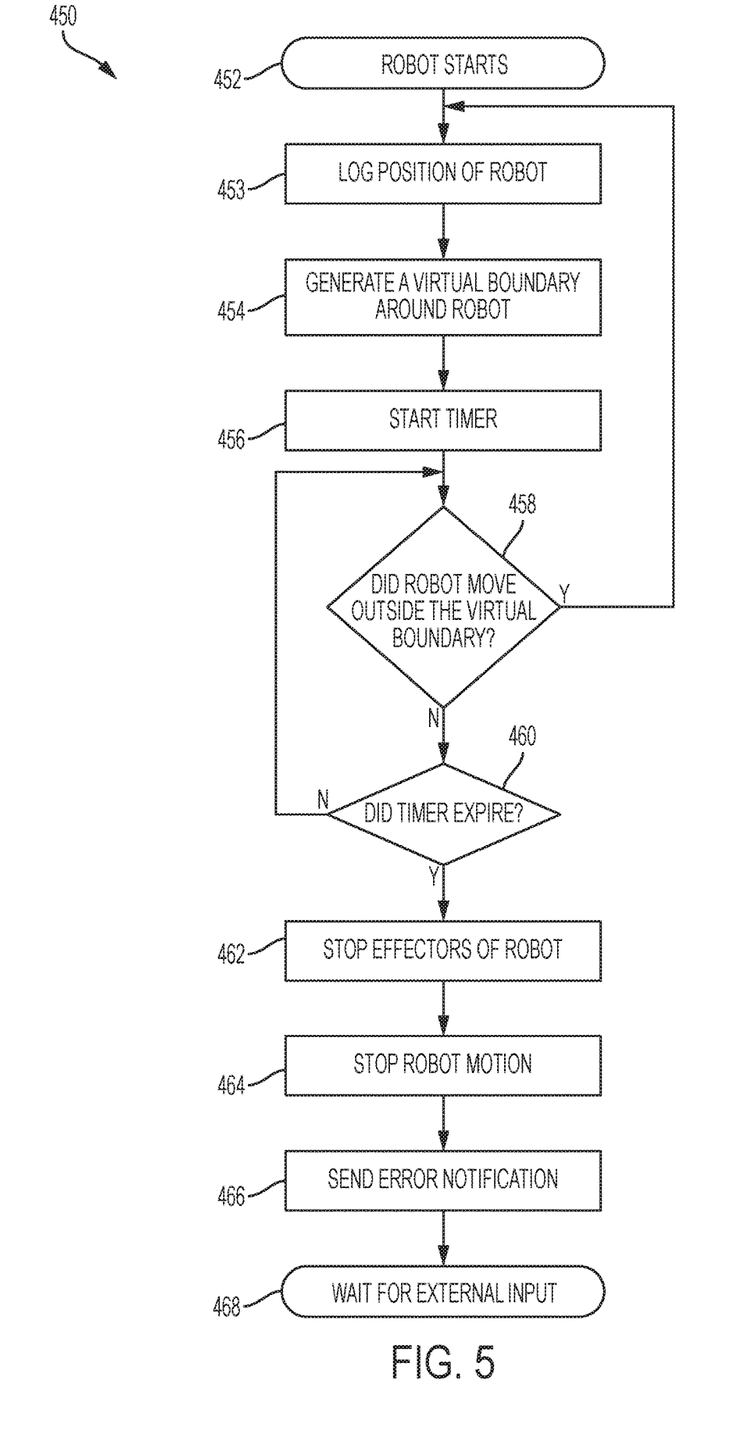
FIG. 5 illustrates a flowchart of a method of determining movement of a mobile robotic device within a known area according to another embodiment.

Next, referring to FIG. 5, a method 450 in accordance with another aspect of the disclosure is illustrated. In some scenarios and/or environments, a self-navigating robotic device such as that described above may encounter a situation in which all sensor readings are as expected, but the robotic device is substantially confined or immobilized for some reason (e.g., caught in a corner, caught between two or more obstacles, disengagement of the drive wheels from the driving surface, etc.). Accordingly, the steps of method 450 are provided in order to avoid continued operation of the robotic device under such scenarios.

First, at step 452, movement of the robotic device is started. At step 453, the position of the robotic device is logged. In some embodiments, the position may be determined as the positions of the robotic device's centroid, i.e., the center point between its two front wheels, or two rear wheels, or other components. This position may be determined by one or more sensors such as, e.g., a GPS sensor, a camera, etc. Next, at step 454, a virtual boundary is generated around the robotic device. The virtual boundary may be, e.g., a 1.0 meter circumferential perimeter around the robotic device, detectable by one or more sensors on the robotic device.

Next, at step 456, a timer is started and, at step 458, a determination is made as to whether or not the robotic device moved outside of the established virtual boundary. If yes, then steps 453, 454, and 456 are repeated for the new position(s) of the robotic device. However, if no, a determination is made at step 460 as to whether or not the timer has expired. If the timer did not expire, it is again determined whether or not the robotic device has moved outside the established virtual boundary (step 458). If yes, and the timer did expire, it is assumed that the robotic device may be stuck or is otherwise unable to move outside of the virtual boundary of its own accord. In this case, at step 462, the effectors of the robotic device are stopped. The effectors may be, for example, cleaning brushes, cleaning fluid dispensers, etc. Then, at step 464, motion of the robotic device is stopped (i.e., the transport assembly of the robotic device is halted), and an error notification is sent at step 466. The error notification may be, e.g., a visual and/or audible indication on the device itself, a remote alert to an operator's workstation, or any combination thereof.

Finally, at step 468, the system awaits external input to correct any issues which may be preventing device travel. For example, an operator may need to dislodge or relocate a stuck robotic device, or the operator may need to service the robotic device to correct any issues relating to sensors, drive mechanisms, etc. In this way, any issues preventing a robotic device from travelling through an area as intended may be promptly addressed, even if most sensor readings may indicate that the robotic device is functioning properly.

Figure 6:
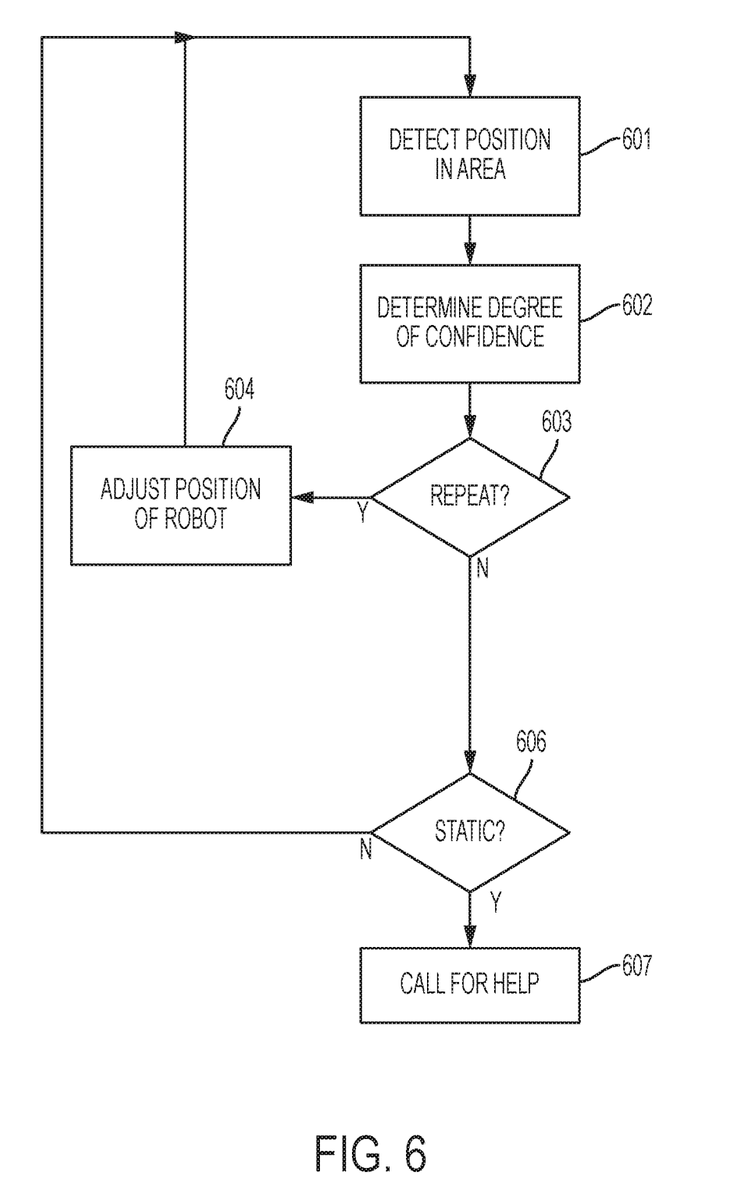
FIG. 6 illustrates an additional method of adjusting movement of a mobile robotic device.

FIG. 6 illustrates how the robotic cleaning device also may use its map data and sensor data to adjust its position to avoid wearing a path in the floor that it cleans due to repeated operation. When the device moves through the area 601 and determines its degree of confidence in its position 602 using methods such as those described in FIGS. 4A and 4B, the device will determine that it about to arrive at a particular location in the area 603. The particular location may be determined as the location of the robotic device's centroid. "About to arrive" means the location in the area at which the robotic device will arrive within a specified time period or range if it stays on its planned course of travel. If the centroid (or other central reference point) is about to arrive at a particular location in the area more than a threshold number of times in a particular time period, the system may cause the transport assembly to slightly shift the course of travel of the robotic device 604 to avoid the centroid passing through that particular location again. The shift may be determined as a fixed distance such as 1 inch, 1 centimeter, 2 centimeters, a distance equal to the width of the robotic device's wheels, or any other number. Alternatively, it the distance of the shift may be determined as a function of the distance between boundaries of the area in which the robotic device is traveling, such as a distance equal to 1% or 5% of the overall distance between the boundaries to the left and right of the device as the device travels through the area. Optionally, the system may require the degree of positional confidence to exceed a proximity threshold value before it will cause the transport assembly to perform the shift. In addition, if the centroid remains static 606 (i.e., if it does not move outside of a boundary of a particular small size) within a threshold period of time, the system may assume that the robotic device is stuck in position, and it may send an alert for help 607 to a remote device.

Figure 7:
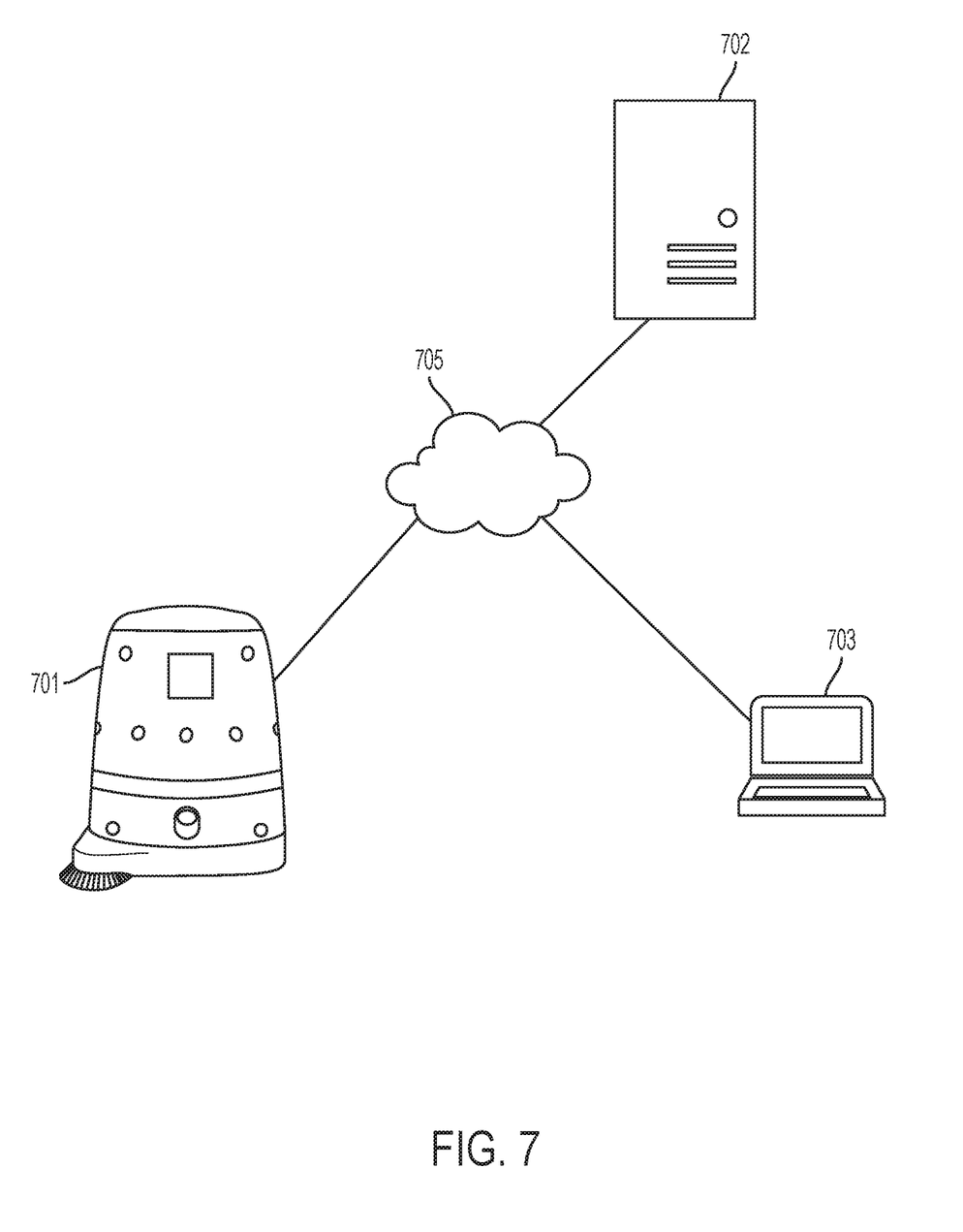
FIG. 7 illustrates a system by which a mobile robotic device may be controlled by a remote server.

FIG. 7 illustrates that any of the processing operations described above may be performed by the robotic device 701 itself, or the robotic device 701 may transmit its sensor data to a remote server 702 or a local electronic device 703 that is in electronic communication with the robotic device 701 via one or more communication networks.

Figure 8:
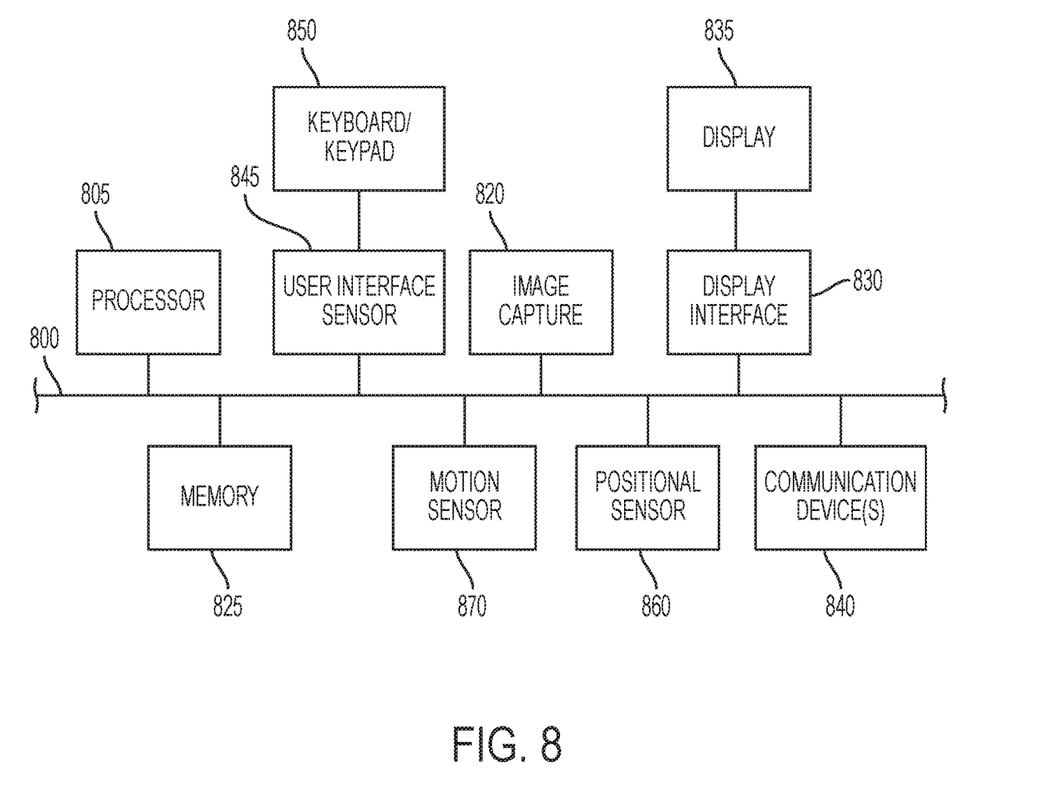
FIG. 8 illustrates example components that may be included in a mobile robotic device or a remote server.

FIG. 8 depicts an example of internal hardware that may be included in any of the electronic components of the system, such as the mobile robotic device or a server that controls the mobile robotic device. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored.

An optional display interface 830 may permit information from the bus 800 to be displayed on a display device 835 in visual, graphic or alphanumeric format. An audio interface and audio output (such as a speaker) also may be provided. Communication with external devices may occur using various communication devices such as a wireless antenna 844, an RFID tag and/or short-range or near-field communication transceiver 842, each of which may optionally communicatively connect with other components of the system. The communication device 840 may be configured to be communicatively attached to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. Digital image frames also may be received from a camera 855 that can capture video and/or still images. The system also may include a positional sensor 860 and/or motion sensor 870 to detect position and movement of the device. Examples of motion sensors 870 include gyroscopes or accelerometers. Examples of positional sensors 860 include a GPS sensor device that receives positional data from an external GPS network, and/or the other sensors described above such as a sonar assembly or LIDAR assembly.

The following U.S. patent documents are fully incorporated into this patent document by reference: (1) U.S. Pat. No. 8,958,937, titled "Cleaning Machine with Collision Prevention"; (2) U.S. Pat. No. 8,679,260, titled "Method and System for Movement of an Automatic Cleaning Device using Video Signal"; (3) U.S. Pat. No. 8,532,860, titled "Method and System for Automatic Yield to High Priority Traffic"; and (4) U.S. Pat. No. 8,423,225, titled Method and System for Movement of Robotic Device using Video Signal.

It will be appreciated that the above-disclosed and other features and functions may be combined into many other different systems or applications. All such applications and alternatives are also intended to be encompassed by the disclosure of this patent document.

The invention claimed is:

1. A method of causing a robotic cleaning device to navigate an area, the method comprising, by a processor:
　accessing a set of map data for an area within which a robotic cleaning device will travel, wherein the set of map data includes information regarding positions of boundaries in the area;
　causing a transport assembly of the robotic cleaning device to move the robotic device in the area at a first speed of movement;
　by at least one sensor that is integral with the robotic cleaning device, collecting sensor data about the area as the robotic device moves in the area;
　comparing the sensor data with the information regarding the area from the set of map data;
　determining a degree of confidence in the sensor data, wherein the degree of confidence represents a measurement of an extent to which the sensor data matches the information regarding positions of one or more boundaries in the area from the set of map data; and
　when the determined degree of confidence is at or below a first threshold degree of confidence, implementing a first reduced speed mode of operation by causing the transport assembly of the robotic cleaning device to move at a second speed of movement, wherein the second speed of movement is lower than the first speed of movement, and causing an additional component of the robotic cleaning device to reduce its speed of operation by a first amount.

2. The method of claim 1, further comprising:
　when the determined degree of confidence is at or below a second threshold degree of confidence, implementing a second reduced speed mode of operation by causing the transport assembly of the robotic cleaning device to move at a third speed of movement, wherein the third speed of movement is slower than both the first speed of movement and the second speed of movement.

3. The method of claim 2, further comprising:
　when the determined degree of confidence is at or below a third threshold degree of confidence, implementing a third reduced speed mode of operation by causing the transport assembly of the robotic cleaning device to stop movement of the robotic cleaning device.

4. The method of claim 3, further comprising, by the processor, providing an alert to a user if movement of the robotic cleaning device is stopped, wherein the alert of comprises one or more of the following: an audible alert emitted directly by the robotic cleaning device, an audible alert emitted remote from the robotic cleaning device, a visual alert emitted directly by the robotic cleaning device, or a visual alert emitted remote from the robotic cleaning device.

5. The method of claim 1, further comprising, by the processor, determining an amount of time the degree of confidence is at or below the first threshold degree of confidence, and incrementally lowering the degree of confidence and further reducing speed of movement of the robotic cleaning device as the amount of time increases.

6. The method of claim 1, wherein collecting information about the area as the robotic cleaning device moves in the area comprises collecting information from at least two different sensor subsystems.

7. The method of claim 1, further comprising lowering the degree of confidence if the information collected by one of the at least two different sensor subsystems does not match information regarding the area from the set of map data.

8. The method of claim 1, wherein:
　determining the degree of confidence comprises determining a highest available degree of confidence when at least a threshold number of sensors that are integral with the robotic cleaning device have collected information that matches the information regarding the area of travel from the map; and
　when the determined degree of confidence is the highest available degree of confidence, the transport assembly moves the robotic cleaning device at a highest available speed of movement.

9. The method of claim 2, wherein:
　collecting the information is performed by at least a first sensor and a second sensor; and
　when the first sensor returns information to the processor that matches the information regarding the area from the set of map data, but the second sensor does not return information that is sufficient to determine whether a match exists, the processor will determine the degree of confidence to be at or below the first threshold but above the second threshold.

10. The method of claim 3, wherein:
　collecting the information is performed by a plurality of sensors; and
　when at least a threshold number of the plurality of sensors do not return information sufficient to determine whether a match exists, the processor will determine the degree of confidence to be below the third threshold.

11. The method of claim 1, further comprising, by the processor, when the sensor data indicates that the robotic cleaning device is within a threshold distance from a boundary, implementing a second reduced speed mode of operation by:
　causing the transport assembly of the robotic cleaning device to move at a third reduced speed of movement, wherein the third speed of movement is slower than the second speed of movement, and
　causing the additional component of the robotic cleaning device to reduce its speed of operation by a second amount.

12. The method of claim 1, wherein:
　the additional component comprises a fluid delivery system for a cleaning assembly; and
　causing the additional element of the robotic cleaning device to reduce its speed of operation by a first amount comprises causing the fluid delivery system to reduce a flow rate of liquid applied to a floor in the area.

13. The method of claim 1, wherein:
　the additional component comprises a cleaning assembly that comprises a brush head; and
　causing the additional element of the robotic cleaning device to reduce its speed of operation by a first amount comprises causing the cleaning assembly to reduce a speed of rotation of the brush head.

14. The method of claim 1, further comprising, by the processor:

determining whether the robotic cleaning device is about to arrive at a location in the area more than a threshold number of times within the time period;

if the robotic cleaning device is about to arrive at the location in the area more than a threshold number of times within the time period and the determined degree of confidence is at or above a proximity threshold value, causing the transport assembly of the robotic cleaning device to alter a path of travel of the robotic cleaning device so that the robotic cleaning device does not arrive at the location more than the threshold number of times within the time period.

15. A mobile robotic system, comprising:
a mobile robotic device;
one or more sensor assemblies, wherein the one or more sensor assemblies comprise one or more sensors;
a processing device; and
a non-transitory, computer-readable medium containing programming instructions configured to cause the processing device to:
  access a set of map data for an area within which the mobile robotic device will travel, wherein the set of map data includes information regarding positions of boundaries in the area,
  cause a transport assembly of the mobile robotic device to move the mobile robotic device in the area at a first speed of movement,
  collect data from the one or more sensors about the area as the mobile robotic device moves in the area,
  compare the data from the one or more sensors with the information regarding positions of boundaries in the area from the set of map data, and
  determine a degree of confidence in the data from the one or more sensors, wherein the degree of confidence represents a measurement of an extent to which the data from the one or more sensors matches the information regarding the positions of one or more boundaries in the area from the set of map data.

16. The mobile robotic system of claim 15, further comprising additional programming instructions configured to cause the processing device, when the determined degree of confidence is at or below a first threshold degree of confidence, to implement a first reduced speed mode of operation by causing the transport assembly of the mobile robotic device to move at a second speed of movement, wherein the second speed of movement is lower than the first speed of movement.

17. The mobile robotic system of claim 16, further comprising additional programming instructions configured to cause the processing device, when the determined degree of confidence is at or below a second threshold degree of confidence, to implement a second reduced speed mode of operation by causing the transport assembly of the mobile robotic device to move at a third speed of movement, wherein the third speed of movement is slower than both the first speed of movement and the second speed of movement.

18. The mobile robotic system of claim 17, further comprising additional programming instructions configured to cause the processing device, when the determined degree of confidence is at or below a third threshold degree of confidence, to implement a third reduced speed mode of operation by causing the transport assembly of the mobile robotic device to stop movement of the mobile robotic device.

19. The mobile robotic system of claim 18, wherein the programming instructions are configured to cause the processing device to activate an alert to the user when the third reduced speed mode of operation is implemented.

20. The mobile robotic system of claim 16, wherein the mobile robotic device comprises a robotic cleaning device, and further wherein causing the mobile robotic device to implement the first reduced speed mode of operation also comprises causing an additional component of the robotic cleaning device to reduce its speed of operation by a first amount.

21. The mobile robotic system of claim 15, wherein the one or more sensor assemblies comprise one or more sonar assemblies, one or more LIDAR assemblies, one or more global positioning system (GPS) devices, one or more microwave sensors, one or more cameras, one or more gyroscopes, one or more infrared (IR) sensors, and one or more structured light sensors.

22. The mobile robotic system of claim 15, wherein the one or more sensor assemblies, the processor device, or both are components of the mobile robotic device.

* * * * *